United States Patent
Arditti et al.

(10) Patent No.: US 7,526,648 B2
(45) Date of Patent: Apr. 28, 2009

(54) CRYPTOGRAPHIC METHOD OF PROTECTING AN ELECTRONIC CHIP AGAINST FRAUD

(75) Inventors: David Arditti, Clamart (FR); Jacques Burger, Bieville Beuville (FR); Henri Gilbert, Bures sur Yvette (FR); Marc Girault, Caen (FR); Jean-Claude Pailles, Epron (FR)

(73) Assignee: France Telecom, Paris (FR)

( * ) Notice: Subject to any disclaimer, the term of this patent is extended or adjusted under 35 U.S.C. 154(b) by 670 days.

(21) Appl. No.: 10/472,993

(22) PCT Filed: Jun. 7, 2002

(86) PCT No.: PCT/FR02/01956

§ 371 (c)(1),
(2), (4) Date: Sep. 25, 2003

(87) PCT Pub. No.: WO03/001464

PCT Pub. Date: Jan. 3, 2003

(65) Prior Publication Data

US 2004/0107353 A1     Jun. 3, 2004

(30) Foreign Application Priority Data

Jun. 26, 2001   (FR) .................. 01 08586

(51) Int. Cl.
*H04L 9/00*    (2006.01)
*G06F 12/14*   (2006.01)

(52) U.S. Cl. ..................... 713/175; 713/194

(58) Field of Classification Search .............. None
See application file for complete search history.

(56) References Cited

U.S. PATENT DOCUMENTS

| | | | |
|---|---|---|---|
| 4,935,962 A * | 6/1990 | Austin ............... | 713/159 |
| 5,406,619 A | 4/1995 | Akhteruzzaman et al. | |
| 6,058,481 A | 5/2000 | Kowalski | |
| 6,233,685 B1 * | 5/2001 | Smith et al. ........... | 713/194 |
| 6,327,661 B1 * | 12/2001 | Kocher et al. .......... | 713/193 |
| 6,757,832 B1 * | 6/2004 | Silverbrook et al. ..... | 713/194 |
| 6,766,452 B1 | 7/2004 | Philipp | |
| 7,113,592 B1 | 9/2006 | Schaefer-Lorinser et al. | |
| 7,284,122 B2 * | 10/2007 | Gilbert et al. .......... | 713/159 |

FOREIGN PATENT DOCUMENTS

WO    WO 97/22093    6/1997

* cited by examiner

*Primary Examiner*—Brandon S Hoffman
(74) *Attorney, Agent, or Firm*—Cohen Pontani Lieberman & Pavane LLP

(57) ABSTRACT

The present invention relates to a cryptographic method of protecting an electronic chip against fraud and a device including an electronic chip which is adapted to protect the electronic chip against fraud. The method includes: mixing some or all of the input parameters ($E_m$) to supply an output data item $E'=(e'_1, e'_2, \ldots, e'_n, \ldots, e'_N)$, changing the state of a finite state automaton from an old state to a new state as a function of the data item $E'=(e'_1, e'_2, \ldots, e'_n, \ldots, e'_N)$, and calculating a certificate (S) by means of an output function having at least one state of the automaton as an input argument. The device includes: mixing means, a finite state automaton, and output means for calculating a certificate (S).

23 Claims, 3 Drawing Sheets

CRYPTOGRAPHIC METHOD OF PROTECTING AN ELECTRONIC CHIP AGAINST FRAUD

RELATED APPLICATIONS

This a U.S. National Phase Application under 35 USC 371 of International Application PCT/FR02/01956, filed on 7 Jun. 2002.

FIELD OF THE INVENTION

The present invention relates to the field of cryptography. In particular, the invention relates to a cryptographic method of protecting an electronic chip against fraud in transactions between the chip and an application. The invention further relates to a device including an electronic chip and adapted to implement a cryptographic method of protecting the electronic chip against fraud.

The invention has a highly advantageous application for protecting microprocessor-based or hardwired logic integrated circuit chips against fraud, especially the chips incorporated in prepaid cards used in diverse transactions such as making telephone calls from a payphone, paying for items from an automatic dispenser, paying a parking charge at a parking meter, or paying for a service such as public transport or the provision of an infrastructure facility (tolls, museums, libraries, etc.).

DESCRIPTION OF THE PRIOR ART

At present prepaid cards are vulnerable to various types of fraud. A first type of fraud consists of unauthorized duplication of the card, which is often referred to as "cloning". A second type of fraud consists of modifying the data attached to a card, in particular the amount of credit stored in the card. Cryptography is used to combat these types of fraud, firstly by authenticating the card and/or the data by means of a digital signature and secondly, and where appropriate, by rendering the data confidential by encryption. Cryptography uses two entities, a verifier and an object to be verified, and can be either symmetrical or asymmetrical. When it is symmetrical, the two entities share exactly the same information, in particular a secret key. When it is asymmetrical, one of the two entities has a pair of keys of which one is secret and the other is public; there is no shared secret key. In many systems using prepaid cards only symmetrical cryptography is used, because asymmetrical cryptography is still slow and costly. The first symmetrical cryptography authentication mechanisms to be developed calculate a different certificate for each card once and for all, store the certificate in the memory of the card, read it on each transaction, and verify it by interrogating an application of the network supporting the transaction in which certificates already allocated are either stored or calculated each time. These mechanisms provide insufficient protection because the certificate can be misappropriated, reproduced and replayed fraudulently, since it is always the same for a given card, and the card can therefore be cloned. To combat cloning, passive card authentication mechanisms are replaced by active mechanisms, which can additionally assure the integrity of the data.

The general principle of active authentication mechanisms is as follows: at the time of an authentication operation, the electronic chip and the application calculate a certificate which is the result of applying a function to a list of arguments determined on each authentication; the list of arguments can include a die, i.e. an item of data determined by the application on each authentication, plus a data item contained in the electronic chip, and a secret key known both to the electronic chip and to the application. If the certificate calculated by the electronic chip is identical to the certificate calculated by the application, the electronic chip is deemed to be authentic and the transaction between the electronic chip and the application is authorized.

The above authentication mechanisms are widely known but most of them require calculation capacities at least equal to those of a microprocessor. Those mechanisms are therefore suitable for microprocessor cards, but are rarely suitable for hardwired logic cards, which have much more rudimentary calculation means. The present invention relates to symmetrical and active authentication mechanisms which can be implemented in a hardwired logic card.

A first such mechanism is the subject matter of French patent FR 89/09734. The method described in that patent defines a nonlinear function which is known to the application and implanted in an electronic chip in the form of a hardwired circuit. A second such mechanism is the subject matter of French patent FR 95/12144. It is a method of protecting cards by unconditionally secure active authentication based on the use, for a limited number of authentication operations, of a linear function assuring both protection against replaying, and of controlled "wearing down" of the secret key.

Each of the two above-cited mechanisms has its own advantages and disadvantages. With regard to the first mechanism, which is based on the hypothesis (which cannot be proved in the current state of knowledge) that the nonlinear function used is secure, the very severe constraints imposed by the reduced calculation capacities of hardwired logic chips do not provide a safety margin as wide as the usual secret key algorithms, and for this reason disclosure of the detailed specification of the nonlinear function used can represent a risk. The second mechanism has the advantage of proven security, provided that the number of authentication operations does not exceed a particular threshold, and there is therefore no risk associated with disclosure of the linear function used; however, the necessity for a strict limit on the number of uses of the authentication function over the service life of the chip (or between successive charging operations in the case of rechargeable cards) that is inherent to this solution can represent a constraint that is difficult to satisfy in some applications. Furthermore, it can be very difficult for the second mechanism to counter attacks on the security modules used to verify the hardwired logic chips, rather than attacks on the chips themselves, whereby a fraudster supplies random responses to verification modules until a sufficient number of good responses is obtained by chance and yields the secret associated with a card number of his choice. Combinations of these two types of mechanism that combine their advantages are the subject matter of French patents FR 00/03684 and FR 00/04313.

Patent FR 89/09734 describes a hardwired microcircuit card in which a series cryptographic function is applied to two operands, one of which is a "keyword" (for example a die R supplied by an entity external to the card) and the other of which is an "output" of the "internal memory" of the card (for example a secret key K or a data item D tied to the application). The series cryptographic function is implemented by a hardwired circuit including a logic operator receiving said keyword and said output of said internal memory, followed by a time-delay logic circuit including time-delay means and forming a loop between the outputs and the address inputs of a secret memory. The output of the logic operator operates on the data outputs of the secret memory to constitute new address inputs of the secret memory.

That method has a number of drawbacks.

A first drawback stems from the fact that the keyword and the output of the internal memory are combined by a simple logic operator. To be more precise, the bits of the keyword are used in succession to constitute the first operand of the logic operator and the bits of the output of the internal memory are used in succession to constitute its second operand. Consequently, the operation of a given bit of the keyword or a given bit of the output of the internal memory on the time-delay logic circuit is limited exclusively to the time at which it is presented to the input of the logic operator.

The robustness of a cryptographic function depends partly on its diffusion qualities, and in particular on a given bit of an input parameter of the algorithm influencing the greatest possible number of steps of the algorithm. Thus the diffusion principle is insufficiently satisfied in the method described in patent FR 89/09734, because each bit of each operand influences only one step. It follows that this could facilitate fraudulent manipulation of the operands. It also follows that this could also facilitate discovering bits that are supposed to remain secret (such as those constituting the secret key K) by observing one or more outputs of the algorithm.

A second drawback stems from the fact that the input arguments of the logic operator of the hardwired circuit are the keyword and the output of the internal memory, which prevents the logic operator combining the output of one internal memory with the output of another internal memory. For example, the logic operator cannot combine a secret key and an application data item written into the chip. It follows that this could facilitate fraudulent modification of application data.

Other drawbacks of the method described in patent FR 89/09734 stem from the use of a time-delay logic circuit having time-delay means and forming a loop between the data outputs and the address inputs of a secret memory.

Firstly, it is not always essential for the memory to be a secret memory. Although there are attacks against cryptograph algorithms that exploit defects that such memories can have, such as defects associated with their nonlinearity, provided that the memories are specified so as not to have such defects they can be made public without compromising the security of the algorithm as a whole. However, although this is not essential, the user can choose to keep them secret in order to make the algorithm more secure.

Secondly, the use of a time-delay logic circuit forming a loop between the data outputs and the address inputs of the memory is very restricting. In particular, this excludes the hardwired circuit having a very long output, since the size of the memory increases exponentially with the length (in bits) of the output. For example, if the output has a length of 4 bits, the memory size is 64 bits. However, if the output has a length of 8 bits, the memory size is 2 kbits, which is a very large size for a low-cost hardwired logic chip. If the output has a length of 16 bits, the memory size is 1 Mbit, which is too large for any hardwired logic chip. However, the length of the output of the hardwired circuit must be such that a fraudster attempting to guess its value by chance has only a negligible chance of succeeding. If the length is 4 bits, the fraudster has a chance of 1 in 16 (i.e. $2^4$), which represents an excessive chance in nearly all applications. If the length is 8 bits, the fraudster has 1 chance in 256, which remains excessive in most applications. Thus the method described in patent FR 89/09734 cannot satisfy simultaneously the technical constraints of a hardwired logic chip and the security constraints of most applications.

SUMMARY OF THE INVENTION

The invention relates to a cryptographic method of protecting an electronic chip against fraud in transactions between an application and the electronic chip, and to a device incorporating an electronic chip and adapted to protect the electronic chip against fraud in such transactions, the method and the device being more particularly suited to hardwired logic chips and more particularly intended to provide an authentication mechanism that is free of the drawbacks referred to above, in order to make the resulting authentication mechanism more robust cryptographically, and thereby to make cloning more difficult.

To this end, the present invention provides a cryptographic method of protecting an electronic chip against fraud in transactions between an application and the electronic chip, which method includes calculating a certificate from input parameters in the electronic chip and further includes:

mixing some or all of the input parameters by means of a mixing function and supplying a mixing function output data item $E'=(e'_1, e'_2, \ldots, e'_n, \ldots, e'_N)$, changing the state of a finite state automaton from an old state to a new state in accordance with a function dependent on at least the old state and a value from the series of bits $(e'_1, e'_2, \ldots, e'_n, \ldots, e'_N)$, and calculating the certificate by means of an output function having at least one state of the automaton as an input argument.

The invention further provides a device which includes an electronic chip and means for executing a cryptographic method of protecting the electronic chip against fraud in transactions between an application and the electronic chip by calculating a certificate from input parameters in the electronic chip and further includes:

mixing means for mixing some or all of the input parameters to supply an output data item $E'=(e'_1, e'_2, \ldots, e'_n, \ldots, e'_N)$ resulting from said mixing, a finite state automaton that changes from an old state to a new state in accordance with a function depending at least on the old state and a value from the series of bits $(e'_1, e'_2, \ldots, e'_n, \ldots, e'_N)$, and output means for calculating the certificate from input arguments including at least one state of the automaton.

Thus the method and the device are based on a mixing function and an automaton. In the case of implementing an authentication mechanism, the input parameters of the method and the device can be a secret key K, a die R, application data D, an address A, an identifier I, etc.

The input parameters of the cryptographic method and of the device are processed by the mixing function, which supplies at its output a data item dependent on some or all of the input parameters. The output data item of the mixing function is operative in changing the state of the finite state automaton, at least one state of which, preferably the final state, is used to calculate the output value S, referred to as the certificate.

Because of the mixing function, the operation of a given bit of an input parameter is not limited exclusively to the time at which it is presented to the input of the means for implementing the method, but to the contrary influences a large number of steps following that time. This satisfies the diffusion principle.

The automaton advantageously enables large certificates (of 16, 32 or even 64 bits) to be obtained without having to store a large number of bits. The automaton does not necessarily consist of a simple time-delay logic circuit forming a loop between the data outputs and the address inputs of a memory.

The certificate obtained using a method and a device according to the invention can be used equally well for exchanging secret keys between the application and the chip or encrypting data exchanged between the application and the chip and for authenticating the chip or the application. It can also be interpreted as an electronic signature of some or all of the input parameters. It can further be interpreted as a sequence of pseudorandom bits and, by varying at least one of the input parameters, the method of calculating the certificate becomes a method of generating pseudorandom bits.

BRIEF DESCRIPTION OF THE DRAWINGS

Other features and advantages of the invention will become apparent in the course of the following description, which is given with reference to the accompanying drawings, of particular embodiments of the invention provided by way of non-limiting example.

DESCRIPTION OF ONE EMBODIMENT

Figure 1:
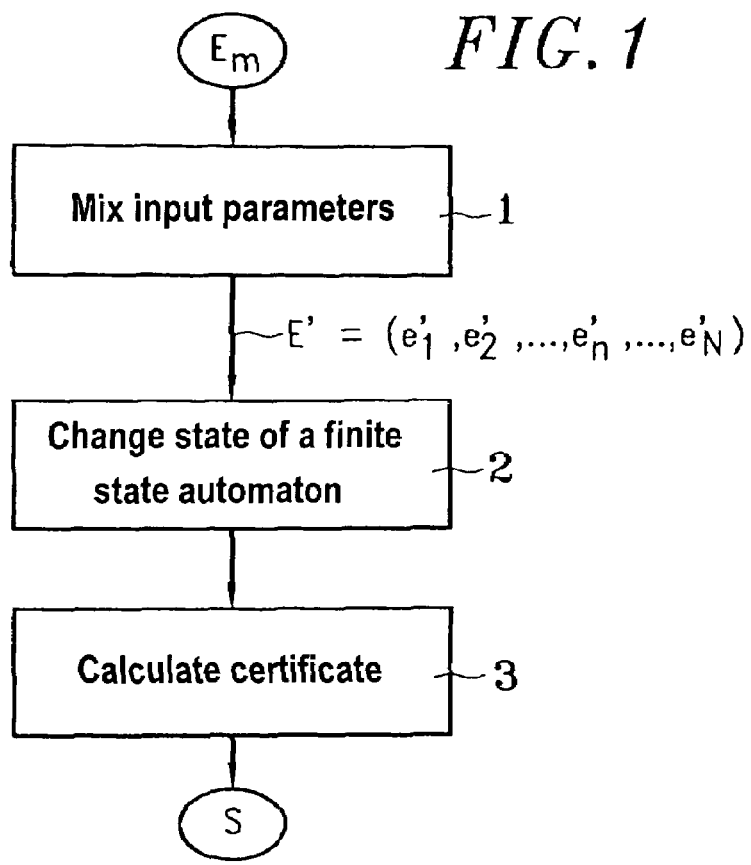
FIG. 1 is a diagram of a method according to the invention.

FIG. 1 shows diagrammatically a method in accordance with the invention of protecting an electronic chip against fraud. The method is made up of functions described below.

A first function 1 is a mixing function which mixes some or all of M input parameters $E_m$ (m=1 to M) and supplies as output a data item $E'=(e'_1, e'_2, \ldots, e'_n, \ldots, e'_N)$, where N is the number of bits in the output data item. Each input parameter $E_m$ comprises a particular number of bits. The input data of the mixing function consists of some or all of the input parameters $E_m$.

A first input parameter $E_1$ can be a secret key K stored in a protected area of the chip, i.e. in a memory area of the chip that cannot be read or modified from the outside. This memory area can be in a register or in a memory, for example.

A second input parameter $E_2$ can consist of data D internal to the chip, i.e. stored in a programmable memory (RAM, PROM, EPROM or E2PROM) of the chip. This data can be of very diverse kinds, and can be written during very different phases of the life of the chip, such as during fabrication of the chip, during fabrication of the object (card, ticket, etc.) in which the chip is incorporated, during personalization of the object by the issuing entity, or during use of the object by the user.

When an input parameter consists of data D internal to the card, a third input parameter $E_3$ can be the address of the memory area or each memory area of the chip in which the data D is stored.

A fourth input parameter $E_4$ can consist of data D' external to the chip and supplied to the chip before executing the cryptographic method, for example at the beginning of the transaction with the application.

A fifth input parameter $E_5$ can be a die R external to the chip and supplied to the chip before executing the cryptographic method, for example at the beginning of the transaction with the application. The die can be a random value, i.e. a value chosen by chance, which is sufficiently large for the probability of choosing two equal values to be very low. It can instead be determined from a series of consecutive integers generated by the application and the electronic chip or from time characteristics, typically the date and the time of day. Finally, it can be a combination of some or all of the options previously cited.

A sixth input parameter $E_6$ can be a die R' internal to the chip and supplied to the chip before executing the cryptographic method. The die can be a random value, i.e. a value chosen by chance, which is sufficiently large for the probability of choosing two equal values to be very low. It can instead be determined from a series of consecutive integers generated by the electronic chip and an outside entity, typically the application, or from time characteristics, typically the date and the time of day. Finally, it can be a combination of some or all of the above-mentioned options.

The above list of parameters is not exhaustive. Increasing the number of parameters has the advantage of making the method more secure, but to the detriment of simple implementation.

The input data of the mixing function, determined from the input parameters $E_m$, can be mathematical objects of any kind, for example bits, fixed or variable length bit strings, integers, non-integer numbers, etc. The same applies to the output data of the mixing function. However, for convenience in describing the method, the output is treated as a series of bits $E'=(e'_1, e'_2, \ldots, e'_n, \ldots, e'_N)$, which in practice is not limiting on the invention.

The mixing function can be a linear function of the input data or a nonlinear function of the input data.

Figure 2:
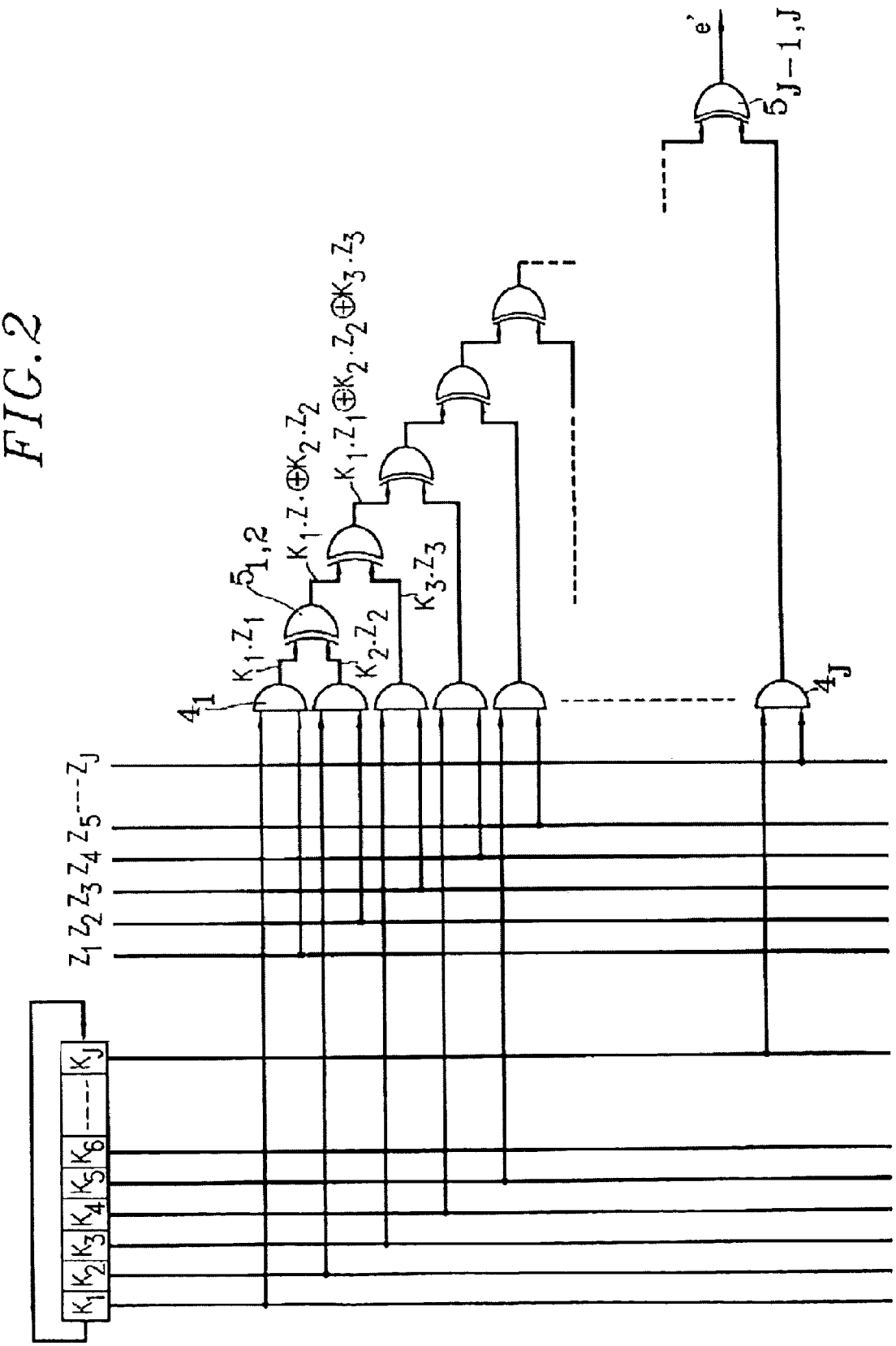
FIG. 2 is a diagram of one example of a mixing function.

A first example of a linear function 1 shown in FIG. 2 consists in calculating the scalar product of the input data. Assuming that the input data consists of a key K that consists of J bits $(K_1, K_2, \ldots, K_J)$, a die R and a data item D that consists of a set of J bits $(Z_1, Z_2, \ldots, Z_J)$, then the first bit of the output data item of the mixing function can be defined as the scalar product of the two data items described above. Thus the first bit of the output data item of the mixing function is equal to the result of applying an exclusive-OR operator to the J bits obtained by calculating for any value of j from 1 to J the product $K_j.Z_j$. In the embodiment shown in FIG. 2, the product $K_j.Z_j$ for j=1 to J is obtained at the output of an AND logic gate $4_j$. The exclusive-OR operator applied to the J bits obtained by calculating for any value of j the product $K_j.Z_j$ consists of a set of exclusive-OR gates $5_{j,j+1}$ for all values of j from 1 to J−1. Each exclusive-OR gate $5_{j,j+1}$ has two inputs and one output. At least one input is the output of an AND logic gate $4_j$ and another input is either the output of an exclusive-OR logic gate $5_{j,j+1}$ or the output of an AND logic gate $4_j$. The output e' of the exclusive-OR gate $5_{j-1,j}$ gives the value of the first bit of the output data item of the mixing function.

To obtain the second bit of the output data item, a rotation operation of one or more positions is applied to the key K. This transforms the key K into a data item K'. The second bit of the output data item of the mixing function can be defined as the scalar product of the data item K' and the set of J bits $(Z_1, Z_2, \ldots, Z_J)$. The second bit is present at the output e' of the exclusive-OR gate $5_{j-1,j}$.

The operations described for obtaining the second bit must be repeated for each bit to obtain the subsequent bits of the output data item.

There are many potential variants based on the linear function 1 defined above. In particular, it is possible to avoid the bits of the output data item entering a repetition cycle as a result of the fact that after J rotations the key K returns to its original state. If I is the required number of output bits, it is possible to use a key K of I+J bits: $(K_1, K_2, \ldots, K_{I+J})$. The first bit of the output data item of the mixing function can be defined as the scalar product of the data items $(K_1, K_2, \ldots, K_J)$ and $(Z_1, Z_2, \ldots, Z_J)$, the second bit of the output data item can be defined as the scalar product of the data items $(K_2, K_3, \ldots, K_{J+1})$ and $(Z_1, Z_2, \ldots, Z_J)$, and so on, up to the last bit of the output data item, which can be defined as the scalar product of the vectors $(K_{I+1}, K_{I+2}, \ldots, K_{I+J})$ and $(Z_1, Z_2, \ldots, Z_J)$.

This variant is advantageous because there is an embodiment, based on parallel calculation of the output bits, that does away with removing the key K each time that an output bit is required. For this, two particular registers of I bits are required, the first initialized with the vector $(K_1, K_2, \ldots, K_I)$ and the second with the null vector $(0, 0, \ldots, 0)$. If $Z_1=0$, the content of the second register remains null. If $Z_1=1$, the content of the first register constitutes the new content of the second register. In both cases, the new content of the first register is $(K_2, K_3, \ldots, K_{I+1})$. This last operation is carried out by effecting a leftward shift of one position and then inserting the new bit $K_{I+1}$. If $Z_2=0$, the content of the second register is not modified. If $Z_2=1$, the new content of the second register is the result of applying an exclusive-OR operator to the contents of the first and second registers. In both cases, the new content of the first register is $(K_3, K_4, \ldots, K_{I+2})$, obtained by effecting a shift and then inserting the new bit $K_{I+2}$. And so on. After reading J bits $(Z_1, Z_2, \ldots, Z_J)$, the I bits contained in the second register are the I output bits of the mixing function.

A second example of a linear function 1 uses a linear feedback shift register in which the bits of the input parameters are entered successively and influence the original state of the register and/or the value of the feedback bits. The expression "disturbed linear feedback shift register" is sometimes used to refer to a register into which data is injected during operation of the register. The output value E' can then be one or more bits extracted from the content of this register.

One example of a nonlinear function 1 uses a nonlinear feedback shift register into which the bits of the input parameters are entered successively. The output value S' can be one or more bits extracted from the content of this register.

A second function 2 consists of changing the state of a finite state automaton from an old state to a new state and taking into account at least the old state and a value from the series of bits $E'=(e'_1, e'_2, \ldots, e'_n, \ldots, e'_N)$, which value corresponds to one or more bits taken from all of the bits of the data item E'. In particular embodiments, this function can further take into account some or all of the input parameters $E_m$. The initial state of the automaton can be determined as a function of some or all of E' and $E_m$.

Figure 3:
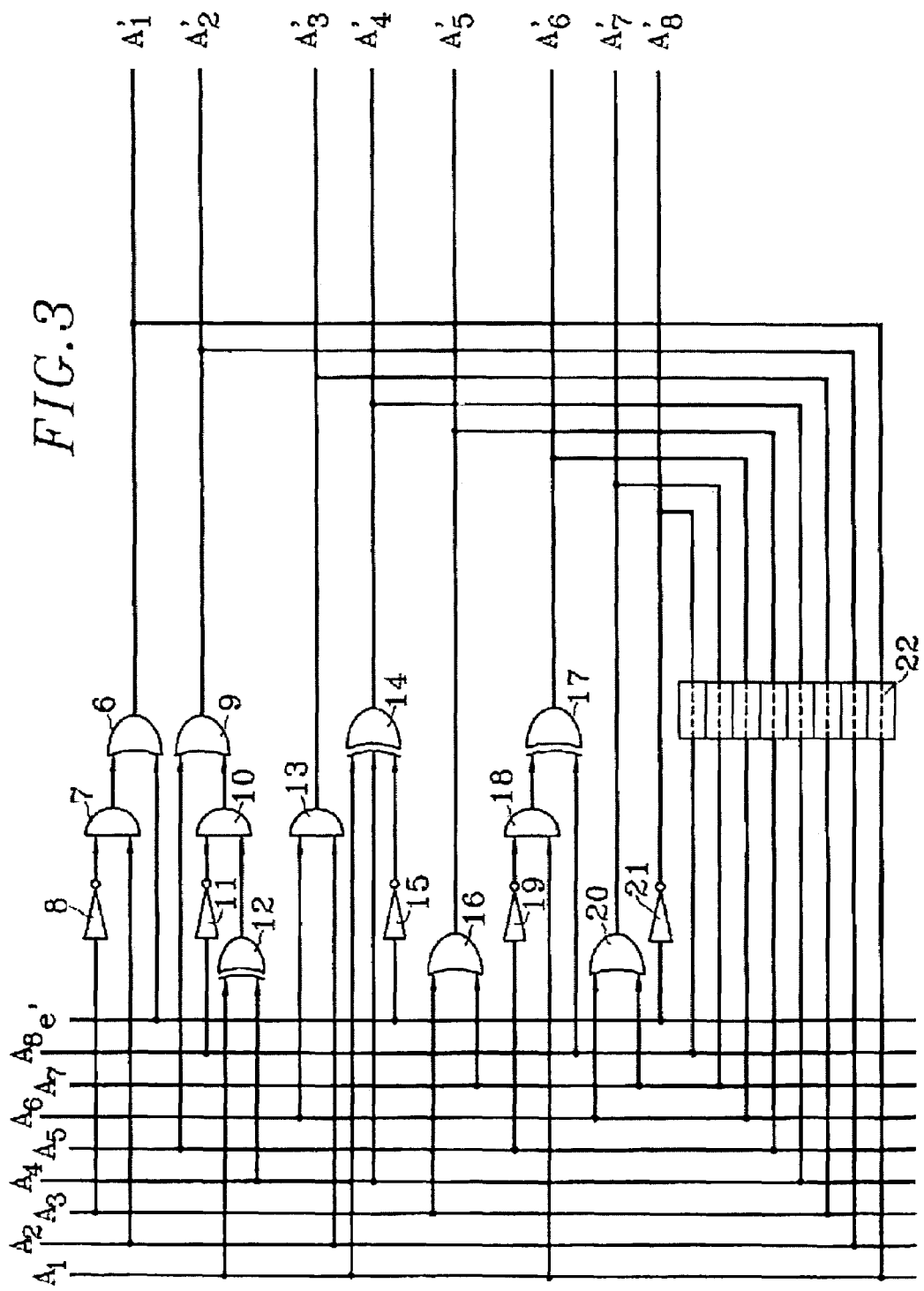
FIG. 3 is a diagram of one example of a finite state automaton.

A first example of an automaton, shown in FIG. 3, consists of using a Boolean circuit, i.e. a circuit which, for example, associates with a vector of k+1 bits $(A_1, A_2, \ldots, A_{k+1})$ a vector of k bits $(A'_1, A'_2, \ldots, A'_k)$ in which each bit $A'_i$ is obtained from the bits $(A_1, A_2, \ldots, A_{k+1})$ with the aid of basic operators such as AND, OR, exclusive-OR, NOT, and where $(A_1, A_2, \ldots, A_k)$ represents the old state of the automaton. For example, if k=8, the outputs of the automaton are given by the following equations, in which $A_9$=e', where e' is any of the bits of $E'=(e'_1, e'_2, \ldots, e'_n, \ldots, e'_N)$:

$A'_1$=(NOT $A_3$) AND $A_2$ OR e'; $A'_2=A_5$ OR ((NOT $A_8$) AND ($A_1$ exclusive-OR $A_4$)); $A'_3=A_6$ AND $A_2$; $A'_4=A_1$ exclusive-OR $A_4$ exclusive-OR (NOT e'); $A'_5=A_3$ OR $A_7$; $A'_6$=(NOT $A_5$) AND $A_1$ exclusive-OR $A_8$; $A'_7=A_6$ OR $A_7$; $A'_8$=(NOT e'). In the embodiment shown diagrammatically in FIG. 3, $A'_1$ is the output of an OR gate 6 of which a first input is e' and a second input is the output of an AND gate 7. The AND gate 7 has a first input $A_2$ and its second input connected to the output of an inverter 8 whose input is $A_3$. $A'_2$ is the output of an OR gate 9 whose first input is $A_5$ and whose second input is connected to the output of an AND gate 10. A first input of the AND gate 10 is connected to the output of an inverter 11 and a second input is connected to the output of an exclusive-OR gate 12. The input of the inverter 11 is $A_8$. The exclusive-OR gate 12 has a first input $A_1$ and a second input $A_4$. An AND gate 13 has an output $A'_3$, a first input $A_6$ and a second input $A_2$. An exclusive-OR gate 14 has an output $A'_4$, a first input $A_1$, a second input $A_4$, and a third input connected to the output of an inverter 15 whose input is e'. An OR gate 16 has an output $A'_5$, a first input $A_3$ and a second input $A_7$. An exclusive-OR gate 17 has an output $A'_6$, a first input $A_8$ and a second input connected to the output of an AND gate 18. The AND gate 18 has a first input $A_1$ and a second input connected to the output of an inverter 19 whose input is $A_5$. An OR gate 20 has an output $A'_7$, a first input $A_6$ and a second input $A_7$. An inverter 21 has an output $A'_8$ and its input is e'. Each bit $A_p$ is the output of a bistable whose input is the bit $A'_p$, for all values of p from 1 to k.

In the example, the automaton has an internal state of k bits $(A_1, A_2, \ldots, A_k)$ and a new state $(A'_1, A'_2, \ldots, A'_k)$ at the output each time that a new vector $(A_1, A_2, \ldots, A_k, e')$ consisting of the internal state and the output of the mixing function is present at the input of the Boolean circuit.

A second example of an automaton uses transformations of bits defined by tables of numbers. When k=8, it is possible, for example, to divide the byte $(A_1, A_2, \ldots, A_8)$ into two quads $(A_1, A_2, A_3, A_4)$ and $(A_5, A_6, A_7, A_8)$, and then to apply a transformation T to each quad if the value of the output bit e' is 0, or a transformation U if the value of the output bit e' is 1. The transformation T is defined by a table which associates with each quad value (a, b, c, d) a quad value (a', b', c', d'). The same applies to U.

When all the input values have been taken into account, the automaton is in a particular final state $(F_1, F_2, \ldots, F_k)$.

A third function 3, referred to as an output function and having input arguments including at least one state of the automaton, calculates a certificate S. The simplest embodiment takes into account only the final state of the automaton. However, the function can also take into account earlier states of the automaton. The output function is preferably the identity function applied to the final state of the automaton. In other words, the certificate S is equal to the data item of k bits $(F_1, F_2, \ldots, F_k)$. In a different embodiment, the output function is a truncation function. The certificate S can be verified by any application knowing the secret key K of the chip. For this, all of the data not known to the application but involved in calculating the certificate, for example data internal to the chip, must be communicated by the chip to the application, before, at the same time as or after sending the certificate. The application uses exactly the same cryptographic process as the chip and the same input data as the chip, and obtains a certificate S'. The application compares the certificate S' that it has calculated with the certificate S calculated by the chip. If they are the same, the application considers the chip to be authentic. The certificate calculated by the application can be verified by the chip to enable the chip to authenticate the application.

Figure 4:
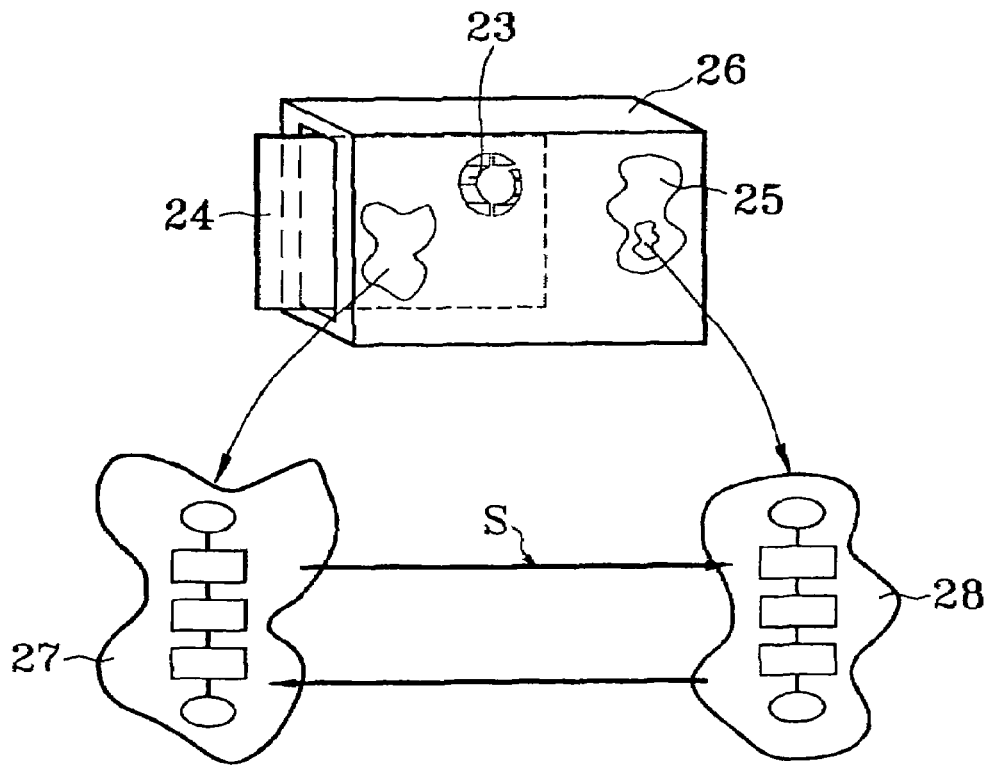
FIG. 4 is a diagram showing the use of a method according to the invention.

FIG. 4 shows the use of a method according to the invention during a transaction between an electronic chip and an application.

The electronic chip 23 is housed in a support 24, for example a prepaid card, an electronic ticket, a bank card, etc.

The application 25 runs wholly or partly in an electronic chip reader 26. The reader can be a contactless reader or a contact reader, as shown in FIG. 4.

If the application is an authentication application, the mere presence of the card in the reader can activate the reader and start the application. The application prompts the chip to identify itself by providing a certificate S calculated (27) by the method according to the invention. In parallel with this, the application calculates (28) a certificate using the same method and the same input parameters as the chip. After this calculation, the chip supplies its result to the application, which compares it with its own result. If the results are identical, the chip is authenticated and the application advises the chip of this. The definitive input parameters can be determined before any use of the electronic chip, implanted in the chip and known to the application. They can be updated after authenticating the card using a particular method. All of the parameters or only some of them can be updated, or the application can provide a new parameter, such as a die R determined at random or by the value of a counter, a clock, a date, etc.

The invention claimed is:

1. A symmetric cryptographic method of protecting a hardwired chip against fraud in transactions between an application and the hardwired chip, the method comprising:
    calculating a certificate (S) from input parameters ($E_m$) in the hardwired chip, wherein one of the input parameters ($E_m$) is a secret key K stored in a protected memory area of the hardwired chip and another of the input parameters ($E_m$) is a die (R) external to the hardwired chip, the die being generated and supplied to the hardwired chip by the application before executing the method;
    mixing some or all of the input parameters ($E_m$) by means of a mixing function and supplying a mixing function output data item $E'=(e'_1, e'_2, \ldots, e'_n, \ldots, e'_N)$;
    changing the state of a finite state automaton from an old state to a new state in accordance with a function dependent on at least the old state and a value from the series of bits $(e'_1, e'_2, \ldots, e'_n, \ldots, e'_N)$; and
    calculating the certificate (S) by means of an output function having at least one state of the automaton as an input argument.

2. The method according to claim 1, wherein a first input parameter ($E_m$) comprises data (D) internal to the chip.

3. The method according to claim 2, wherein a second input parameter ($E_m$) is the address of said data (D) in a memory area of the chip.

4. The method according to claim 1, wherein one of the input parameters ($E_m$) comprises data (D') external to the chip and supplied to the chip before executing the method.

5. The method according to claim 1, wherein the die (R) is a value chosen by chance.

6. The method according to claim 1, wherein the die (R) is a value of a counter.

7. The method according to claim 1, wherein the die (R) is a date and time of day.

8. The method according to claim 1, wherein the mixing function is a linear function of the input parameters ($E_m$).

9. The method according to claim 8, wherein the mixing function produces scalar product of some or all of the input parameters ($E_m$).

10. The method according to claim 1, wherein the automaton takes into account as input some or all of the input parameters ($E_m$).

11. The method according to claim 1, wherein the output function is an identity function having the new state of the automaton as an input argument.

12. The method according to claim 1, wherein the output function is a truncation function having the new state of the automaton as an input argument.

13. The method according to claim 1 applied to authentication of the chip by the application, wherein the application compares the certificate (S) calculated by the electronic chip to a certificate (S') that it calculates in the same way as the electronic chip.

14. The method according to claim 1 applied to authentication of the application by the chip, wherein the electronic chip compares the certificate (S) that it calculates to a certificate (S') calculated in the same as by the application.

15. A device comprising:
    a hardwired chip;
    means for executing a symmetric cryptographic method of protecting the hardwired chip against fraud in transactions between an application and the hardwired chip by calculating a certificate (S) from input parameters ($E_m$) in the hardwired chip, wherein one of the input parameters ($E_m$) is a secret key K stored in a protected memory area of the hardwired chip and another of the input parameters ($E_m$) is a die (R) external to the hardwired chip, the die being generated and supplied to the hardwired chip by the application before executing the method;
    mixing means for mixing some or all of the input parameters ($E_m$) to supply an output data item $E'=(e'_1, e'_2, \ldots, e'_n, \ldots, e'_N)$, resulting from said mixing;
    a finite state automaton that changes from an old state to a new state in accordance with a function depending at least on the old state and a value from the series of bits $(e'_1, e'_2, \ldots, e'_n, \ldots, e'_N)$; and
    output means for calculating the certificate (S) from input arguments including at least one state of the automaton.

16. The device according to claim 15, wherein the mixing means include a linear feedback shift register into which input parameter bits are entered successively and which influences the initialization of the register and/or the value of the feedback bits to mix some or all of the input parameters ($E_m$) and supply at the register output date item $E'=(e'_1, e'_2, \ldots, e'_n, \ldots, e'_N)$.

17. The device according to claim 15, wherein the mixing means include a nonlinear feedback shift register into which input parameter bits are entered successively and which influences the initialization of the register and/or the value of the feedback bits to mix some or all of the input parameters ($E_m$) and supply at the register output data item $E'=(e'_1, e'_2, \ldots, e'_n, \ldots, e'_N)$.

18. The device according to claim 15, wherein the automaton includes a Boolean circuit.

19. The device according to claim 15, wherein the automaton includes a loop circuit between the outputs and the address inputs of one or more memories.

20. A prepaid card including a device according to claim 15.

21. A ticket including a device according to claim 15.

22. An access terminal to a public service, including a device according to claim 15.

23. An electronic payment terminal including a device according to claim 15.

* * * * *